July 13, 1965  H. NERWIN  3,194,132
AUTOMATIC EXPOSURE CONTROL APPARATUS
Filed May 11, 1961  8 Sheets-Sheet 1

FIG. 1

HUBERT NERWIN
INVENTOR.

BY *R. Frank Smith*
*Robert W. Hampton*
ATTORNEYS

July 13, 1965  H. NERWIN  3,194,132
AUTOMATIC EXPOSURE CONTROL APPARATUS
Filed May 11, 1961  8 Sheets-Sheet 2

HUBERT NERWIN
INVENTOR.

BY R. Frank Smith
Robert W. Hampton
ATTORNEYS

July 13, 1965     H. NERWIN     3,194,132
AUTOMATIC EXPOSURE CONTROL APPARATUS
Filed May 11, 1961     8 Sheets-Sheet 7

HUBERT NERWIN
*INVENTOR.*

BY *R. Frank Smith*

*Robert W. Hampton*
ATTORNEYS

United States Patent Office 3,194,132
Patented July 13, 1965

3,194,132
AUTOMATIC EXPOSURE CONTROL APPARATUS
Hubert Nerwin, Rochester, N.Y., assignor to Eastman Kodak Company, Rochester, N.Y., a corporation of New Jersey
Filed May 11, 1961, Ser. No. 109,294
28 Claims. (Cl. 95—10)

The present invention relates to photographic cameras having photoelectric exposure control systems wherein the position of the pointer of an exposure meter measuring instrument is sensed by a manually driven member coupled to the diaphragm and/or shutter speed setting member. The invention relates further to such cameras having focus adjustment for the taking lens and to a structural relation between the focus adjustment and the exposure adjustment.

Where the exposure meter referred to above has a "non-logarithmic response," a primary object of the invention is to compensate for changes in an exposure factor such as film speed, by moving the entire measuring instrument of the exposure meter in an arcuate path substantially equidistant to a curved surface of a sensing member for the instrument pointer, in order to establish a logarithmic relation between field luminance, or brightness and the adjustment of one or more exposure regulating devices, irrespective of the position of the measuring instrument, i.e., irrespective of film speed. According to one feature of the invention the measuring instrument is positioned automatically as a function of film speed in response to insertion of a film magazine, which has a control notch for positioning the instrument, the notch being located on the magazine in accordance with the speed of the film contained therein.

Another object of the invention is to establish a manual focus adjustment during daylight operation of the camera, when both the diaphragm opening and the shutter speed are adjustable automatically as related functions of field brightness, and to establish a fixed shutter speed during flash operation of the camera, when the diaphragm opening and focus adjustments are mutually coupled for manual adjustment.

According to another feature of the invention the blades of an iris diaphragm are pivotally mounted at each end to separately rotatable rings, one of which rings is movable in conjunction with the pointer sensing member for adjusting the diaphragm during daylight operation of the camera, and the other of which rings is movable independently of the pointer sensing member for adjusting the diaphragm during flash operation of the camera.

Other objects of the invention will appear from the following description, reference being made to the accompanying drawings, wherein.

For the sake of brevity the shutter and focus mechanisms employed in conjunction with the present invention are not shown in their entirety. The entire shutter mechanism is disclosed in detail in Eastman Kodak Company Apparatus & Optical Division Service Manual No. 620; this shutter mechanism is available commercially as a component of the Kodak Poney IV Camera. The focus adjusting mechanism is of the rotary type well known in the art, for example as illustrated in U.S. Patent 2,143,813.

AUTOMATIC EXPOSURE CONTROL

First embodiment

Figure 1:
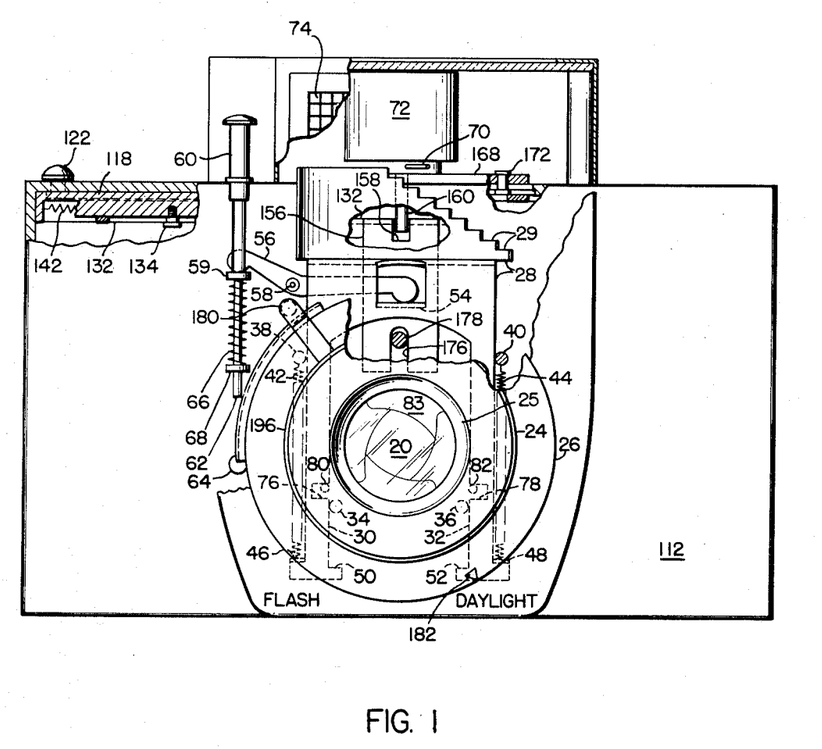
FIG. 1 is a front view of the camera, partly broken away, showing the photoelectric exposure control mechanism and the film-speed adjusting mechanism.
Figure 2:
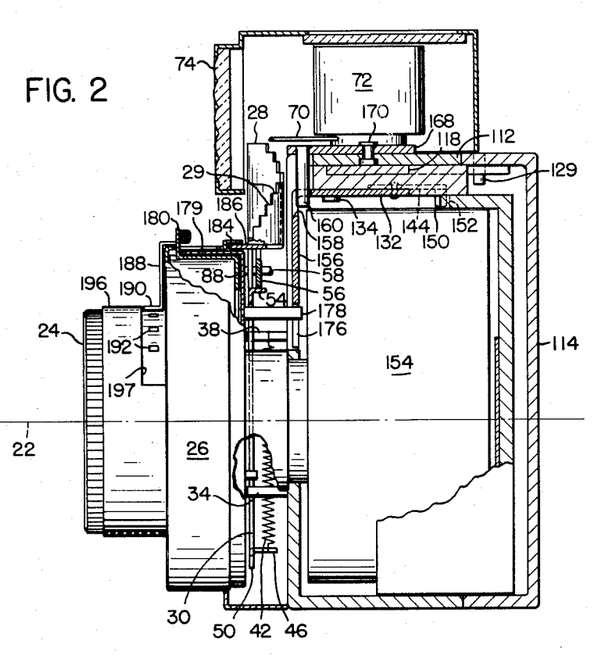
FIG. 2 is a right side view, partly in section, of the structure shown in FIG. 1.
Figure 3:
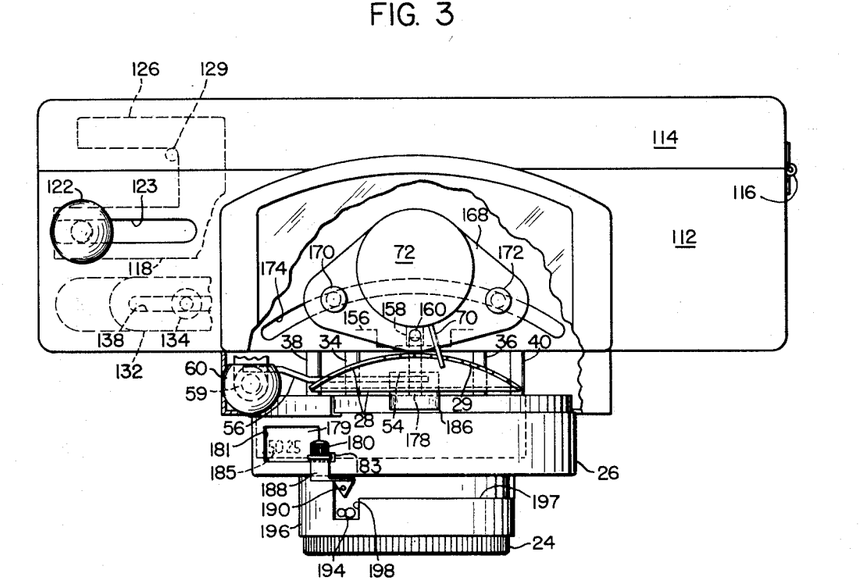
FIG. 3 is a top view, partly broken away, of the mechanism shown in FIGS. 1 and 2.

Referring to FIGS. 1, 2 and 3, a typical camera embodying the present invention includes a taking lens 20 arranged on an axis 22 and mounted in a focusing member 24 mounted for rocking movment about a hub 25. On the rear surface of a shutter housing 26 a sensing member 28 is arranged symmetrically relative to hub 25. The sensing member 28 is adapted to slide vertically and for this purpose has a pair of arms 30 and 32, which are guided by a pair of lower studs 34 and 36 and a pair of upper studs 38 and 40. The upper studs 38 and 40 also serve as posts for a pair of springs 42 and 44, which are connected to respective ears 46 and 48 of the sensing member and urge the latter in an upward direction as shown in FIG. 1. Respective lobes 50 and 52 are provided on arms 30 and 32 of the sensing member for engagement with lower studs 34 and 36 to limit the upward travel of the sensing member.

On the upper portion of sensing member 28 a projecting ear 54 is adapted for contact by one end of a rocker 56, which is pivotally mounted at 58. The other end of rocker 56 cooperates with a flange 59 on the camera actuating member 60, which is mounted for vertical movement on the front surface of the camera and has a bottom surface 62 adapted to contact the shutter release lever 64 for tripping the shutter after the sensing member 28 has undergone its maximum upward movement in the manner described below. A compression spring 66, which is stronger than the combination of springs 42 and 44, is mounted on actuating member 60 between the lower surface of flange 59 and a fixed support 68. Spring 66, which is adapted for compression by manual depression of member 60, normally maintains that member in its uppermost position, thereby maintaining rocker 56 in its maximum clockwise position (as viewed in FIG. 1) and maintaining sensing member 28 in its lowermost position with springs 42 and 44 under tension.

A sloping upper edge 29 of sensing member 28 is adapted to engage the pointer 70 of a measuring instrument 72 as the sensing member is moved upwardly by springs 42 and 44 when actuating member 60 is manually depressed. The sloping edge 29 preferably is stepped, as shown in the drawings, in order to contact pointer 70 only in the direction of movement of sensing member 28. The measuring instrument, along with a photocell 74 by which it is energized, constitutes an exposure meter. In a manner well known in the art pointer 70 is moved to the right (as viewed in FIGS. 1 and 3) in response to greater field brightness and therefore permits sensing member 28 to move further upward before its sloping edge 29 contacts the pointer. Continued depression of actuating member 60, after sensing member 28 contacts pointer 70, trips the shutter release lever 64.

Figure 4:
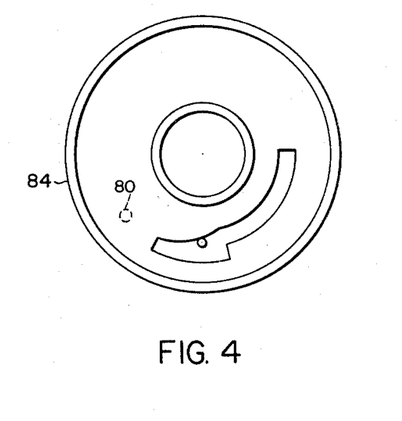
FIG. 4 is a front view of a portion of the shutter speed control mechanism.
Figure 5:
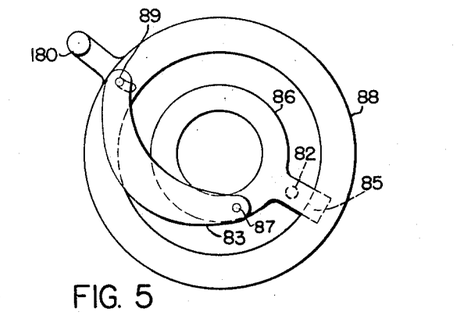
FIG. 5 is a front view of a portion of the diaphragm control mechanism.

A pair of recesses 76 and 78 in the respective lower arms 30 and 32 of sensing member 28 are adapted to receive pins 80 and 82, which are integral with the shutter speed ring 84 (FIG. 4) and with an arm 85 (FIG. 5) mounted on the inner one of two rotatably mounted diaphragm rings 86 and 88. Each of a plurality of diaphragm blades 83 is pivotally mounted at each of its ends at 87 and 89 to rings 86 and 88, respectively. It will be seen that counterclockwise rotation of ring 86 or clockwise rotation of ring 88 moves the diaphragm blades 83 in a direction to reduce the size of the taking lens aperture. As will be described hereinbelow in greater detail, ring 86 is moved during daylight operation of the camera and ring 88 is moved during flash operation; during either type of operation, one of the rings remains stationary to form a member on which the diaphragm blades are pivoted. The shutter speed ring 84 (FIG. 4) and the diaphragm rings 86 and 88 constitute "exposure regulating devices," as that term is employed in the appended claims.

As the sensing member 28 (FIGS. 1–3) moves upwardly, the lower surfaces of recesses 76 and 78 contact pins 80 and 82 and move them upwardly until the sensing member is stopped by the instrument pointer 70. This movement rotates rings 84 and 86 clockwise and counterclockwise, respectively, to adjust both diaphragm opening and shutter speed as related functions of scene brightness.

From the foregoing it is seen that both diaphragm and shutter speed are adjusted during the upward movement of the sensing member 28. These exposure factors are adjusted in the same sense, i.e., from larger to smaller diaphragm opening and from lower to higher shutter speed, or vice versa, so that the overall exposure value is changed either from low to high or vice versa in response to upward movement of sensing member 28. In the embodiments of the invention illustrated in the accompanying drawings, the concurrent automatic adjustments are from larger to smaller diaphragm opening and lower to higher shutter speed.

Figure 10:
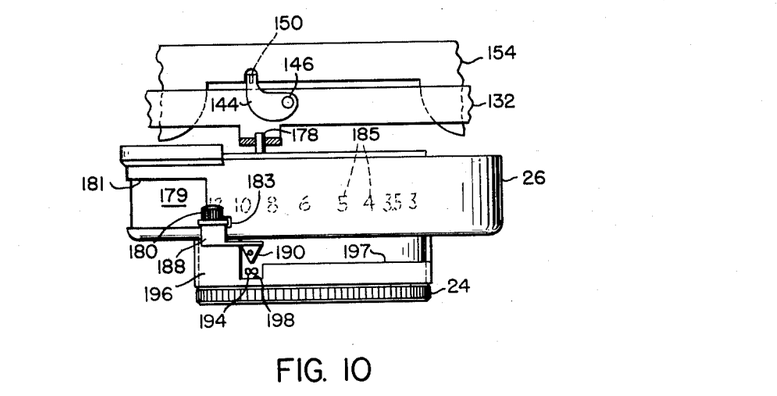
FIGS. 10–15 are top views of the front portion of the camera, showing the various relations between the diaphragm and focus adjusting mechanisms and scales.

Therefore, when shutter housing 26 is in the position as illustrated in FIG. 1 with index mark 182 aligned with "Daylight," the camera is fully automatic and its operation is as follows:

To photograph a selected subject, the operator first focuses the camera by turning focusing member 24 until the correct distance marking on scale 194 appears in slot 198 of cover member 196 (see FIG. 10). Next, the operator directs the camera at the subject to be photographed, and light reflected from the subject impinges upon photocell 74 and causes pointer 70 of measuring instrument 72 to deflect to the right, the amount of the deflection being proportional to the intensity of the incident light. After the subject has been properly framed in the camera's viewfinder (not shown), the operator depresses camera actuating member 60. This releases rocker 56 which in turn releases sensing member 28, permitting the latter to move in an upward direction under the influence of springs 42 and 44.

The upward motion of released sensing member 28 imparts, as explained above, clockwise and counterclockwise motion, respectively, to setting members 84 and 86, thereby causing the camera's shutter speed setting to move from its minimum speed position toward its maximum and, similarly, causing the camera's aperture to be gradually narrowed from its maximum opening toward its minimum. Sensing member 28 continues in its upward motion until its stepped sloping edge 29 contacts pointer 70 and is stopped. This in turn stops the movement of setting members 84 and 86 in respective positions which assure a film exposure properly responsive to the intensity of the scene being photographed. This automatic exposure setting is accomplished in a relatively short time, and as the operator continues to press camera actuating member 60 downward, it ultimately reaches the bottom of its stroke, tripping shutter release lever 64 and causing exposure of the film in the camera.

It can be seen that the mechanism just described is a fully automatic control device which is "programmed" to provide predetermined relationships of shutter speed and diaphragm aperture size, the relationships varying in accordance with the intensity of the light reflected from the scene in a manner well known in the art.

One of the unique features of the invention herein lies in the combination of the just described automatic system with a manual override for use in taking flash pictures. However, prior to explaining the flash control mechanism in detail, a second embodiment of the automatic exposure control mechanism and certain features of the exposure meter device common to both embodiments will be described.

Second embodiment

While the fully automatic, programmed exposure system described immediately above may be adequate for most amateur requirements, it is often desirable to have some control left to the discretion of the camera operator to provide for those occasions when the operator is particularly desirous of obtaining pictures having a certain assured depth of field (necessitating a small aperture), or where he requires a high shutter speed in order to stop action. In such cases, the "programmed" system of the camera may not assure the desired result. For instance, let us assume that the operator wishes to take a picture of speeding automobiles under conditions of scene illumination in which the intensity of reflected light would normally cause the camera's automatic exposure system to select the "programmed" relationship of an aperture of $f/8$ and a shutter speed of $\frac{1}{100}$ of a second. While this would assure proper exposure, the operator would be more certain of stopping the action (still with proper exposure) with a relationship of $f/5.6$ and $\frac{1}{200}$. The second embodiment of the invention herein anticipates such contingencies and provides means for giving the operator additional control while retaining the advantages of a fully automatic exposure control system.

Figures 6, 6A, 7:
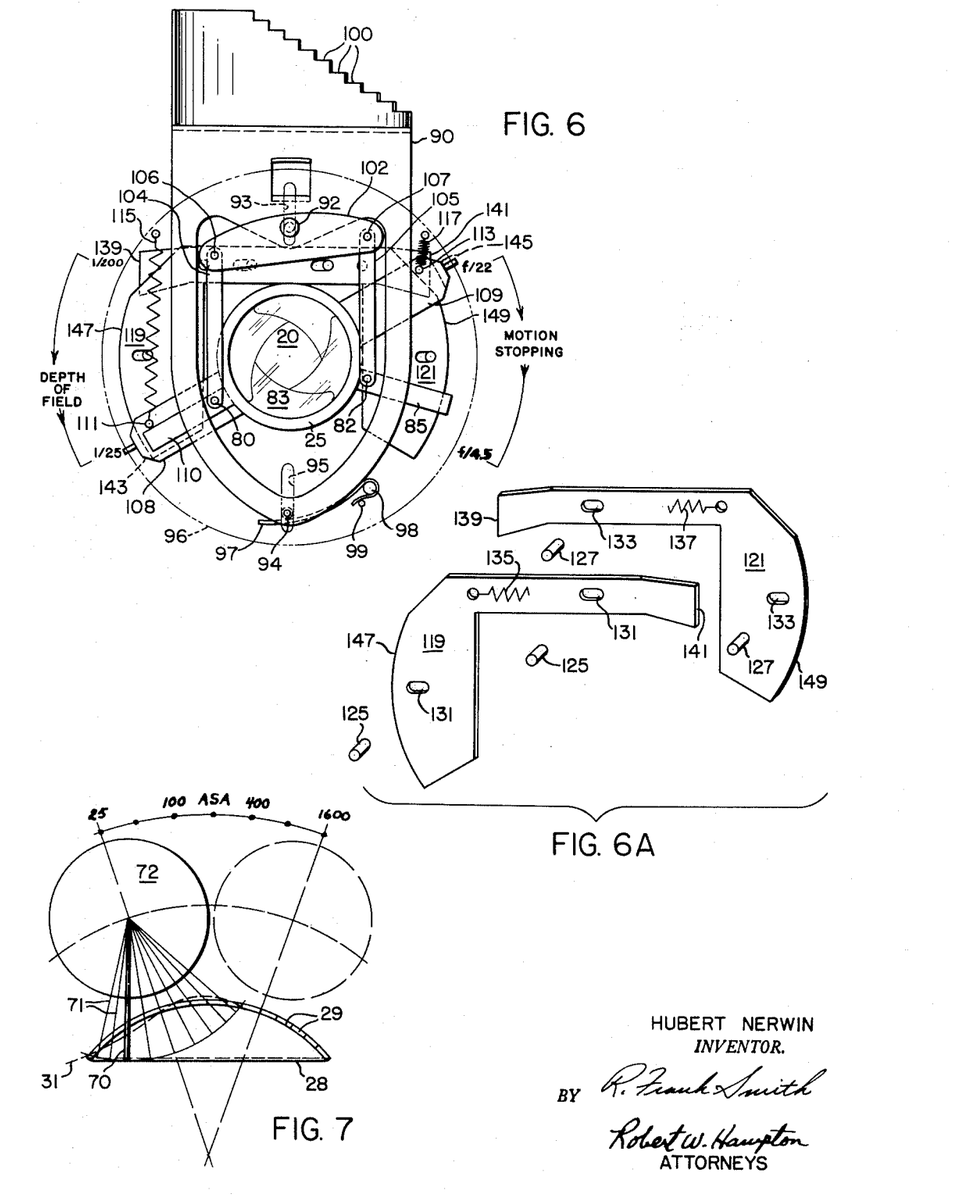
FIG. 6 is a partial front view of the camera illustrating an alternate embodiment of the exposure control mechanism.
FIG. 6A is an exploded isometric view of the limit-selection interlock mechanism used in the embodiment shown in FIG. 6.
FIG. 7 is a top view of a portion of the camera illustrating schematically the relation between the range of positions of the measuring instrument and the range of positions of the instrument pointer sensing member.
Figure 8:
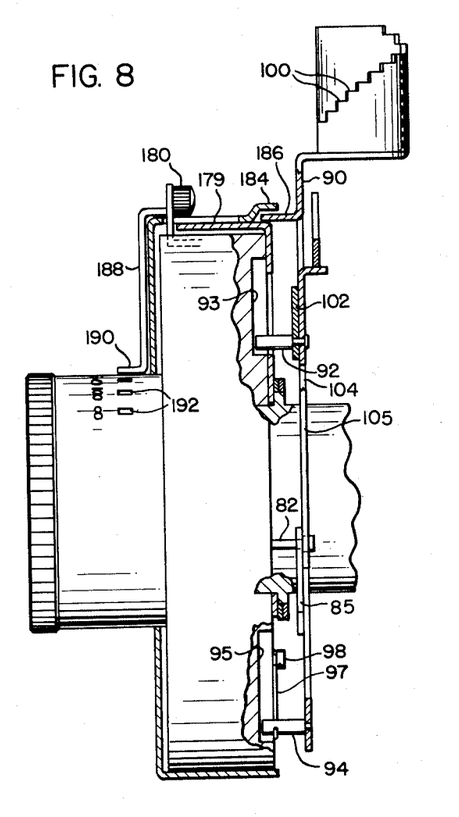
FIG. 8 is a right side view, partly in section, of the exposure control mechanism shown in FIG. 6.
Figure 9:
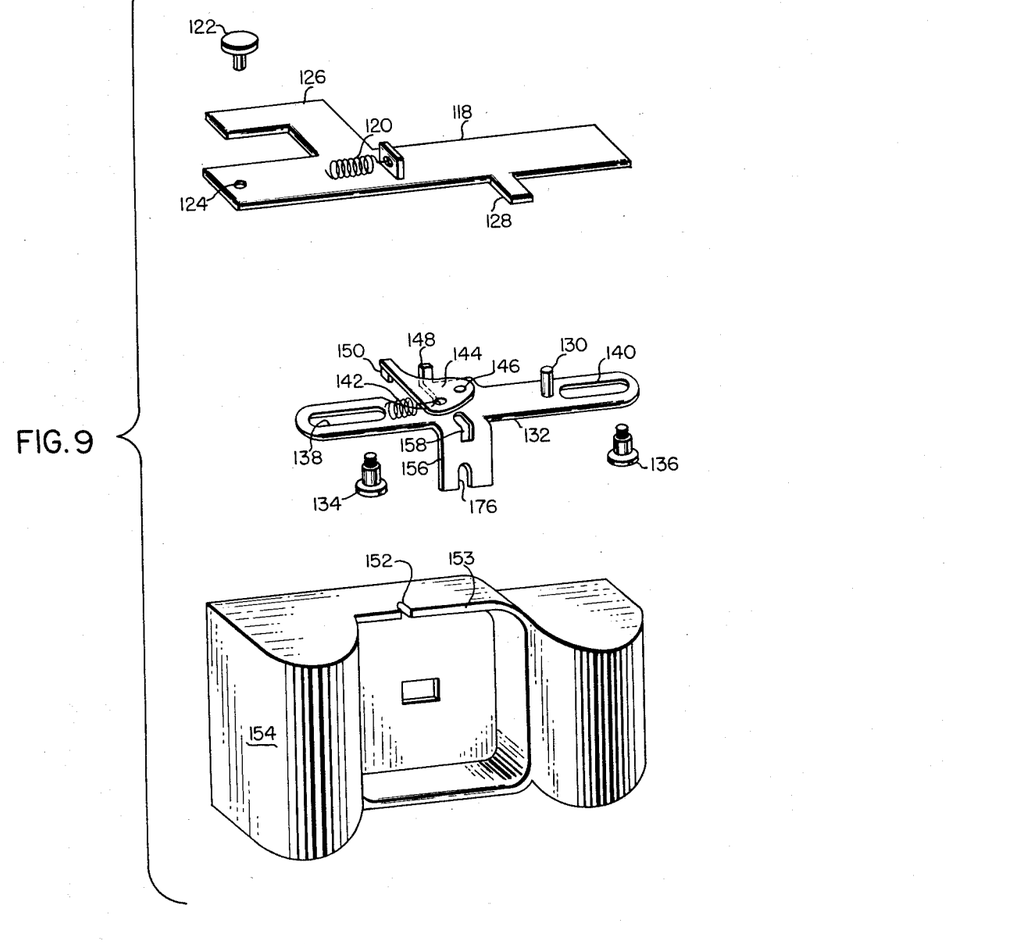
FIG. 9 is an exploded isometric view of the film-speed setting mechanism.

FIGS. 6 and 8 illustrate this second embodiment of the exposure control mechanism. A pointer sensing member 90 is mounted by studs 92 and 94 for vertical movement. The studs move in respective slots 93 and 95 in a shutter housing plate 96. A spring 97 supported on a post 98 presses against a fixed pin 99 and the previously described stud 94 for driving sensing member 90 upwardly in the same manner as described in connection with the previous embodiment. A sloping and preferably stepped upper edge 100 of sensing member 90 cooperates with the instrument pointer as previously described.

A rocker 102 is centrally mounted on stud 92 for pivotal movement. A pair of connecting arms 104 and 105 are pivotally mounted on rocker 102 at 106 and 107, respectively, and are pivotally mounted by the previously described pins 80 and 82 (FIGS. 4 and 5) on shutter speed ring 84 and diaphragm ring 86, respectively. Initial upward movement of sensing member 90 (FIG. 6) moves both connecting arms 104 and 105 upwardly, thereby rotating the shutter speed ring 84 (FIG. 4) and the inner diaphragm ring 86 (FIG. 5) clockwise and counterclockwise, respectively, for adjusting both diaphragm and shutter speed in the manner previously described.

A pair of members 108 and 109 (FIG. 6) mounted concentrically with hub 25 are adapted for stopping the adjustment of either the diaphragm or the shutter speed at any selected intermediate values less than the ultimate values of adjustment which would occur (with the same field brightness) in the embodiment shown in FIGS. 1–3. Stop pins 111 and 113 are mounted on members 108 and 109, respectively. Pin 111 cooperates with an arm 110 integral with the shutter speed ring and pin 113 cooperates with the previously described arm 85 integral with the inner diaphragm ring, for limiting the adjustment of the shutter or the diaphragm, respectively. When the adjustment of one of these exposure regulating devices is thus limited, rocker 102 pivots about its axis 92 in response to further upward movement of sensing member 90 and thereby permits the other of the exposure regulating devices to continue being adjusted. Therefore, rocker 102 constitutes differential means interrelating arms 104 and 105, i.e., interrelating the shutter and the diaphragm.

It will be seen that by moving member 108 counterclockwise or downwardly, as shown in FIG. 6, a minimum shutter speed (a maximum exposure time) will be selected and pin 82 will move a greater distance upwardly during the upward movement of sensing member 90, thereby selecting a smaller diaphragm aperture and providing a greater depth of field. Therefore, it may be desirable to have an arrow indication of the type shown on the lefthand side of FIG. 6 indicating that downward selecting movement of member 108 will improve the depth of field at the time of the exposure. Similarly, the downward movement of member 109 corresponds to greater motion stopping by selecting a larger exposure aperture and therefore a higher shutter speed (shorter exposure time); this may be indicated by the corresponding markings on the righthand side of FIG. 6.

Ordinarily it is desirable that only one of the stop members 108 and 109 be moved from its uppermost position to limit the adjustment of the corresponding exposure regulating device (shutter or diaphragm), because limiting both would unnecessarily limit the automatic exposure range of the camera and would accomplish nothing of practical value to the ordinary amateur photographer. Accordingly, an interlock device may be provided to prevent both of the stop members 108 and 109 from being moved away from their respective uppermost positions at any one time.

For this purpose, each stop member 108 and 109 is urged to its uppermost position by a respective spring 115 and 117. A pair of interlock plates 119 and 121 (shown best in FIG. 6A) are guided for horizontal sliding movement by pins 125 and 127 engaging respective pairs of horizontal slots 131 and 133 in the plates. Plates 119 and 121 are urged to the right and to the left, respectively, by springs 135 and 137, and have respective arms 139 and 141 cooperating with ears 143 and 145 on the outer ends of stop members 108 and 109. When a first one of the stop members is in its uppermost position its ear 143 or 145 engages arm 139 or 141 and forces the corresponding plate 119 or 121 to the left or right, respectively, against the tension of its spring 135 or 137. This forces an arcuate outer edge 147 or 149 of the plate 119 or 121 thus moved into juxtaposition with the path of the ear 145 or 143 of the other stop member 109 or 108, so that the latter, if then moved away from its uppermost position, is held in any selected downward position by frictional engagement between its ear 145 or 143 and surface 149 or 147 of the adjacent interlock plate 121 or 119. Subsequent movement of the first stop member 108 or 109 downward releases the shifted interlock plate so that the other stop member is moved to its uppermost position by its spring.

To explain the operation of the second embodiment, it may be assumed first that the camera operator is attempting to take a picture of a landscape and wants the focus to be sharp from the corner of a fence appearing in the foreground of the picture and only a few feet from the camera to an object on a hill several hundred feet away. Under such conditions (assuming also that there is no moving subject near the foreground of the scene), the setting of the camera aperture is much more critical to a good photograph than is its shutter speed, since it is important that the camera aperture remain as small as possible within the limits of good exposure to provide the picture with the greatest depth of field. In this case, the camera operator moves member 109 to its uppermost position as illustrated in FIG. 6, causing interlock plate 119 to be moved to the left so that arcuate outer edge 147 of interlock plate 119 comes into frictional contact with ear 143 of setting member 108. The operator then moves setting member 108 to its lowest position, i.e., to the slowest shutter speed (maximum exposure time), as illustrated also in FIG. 6. The frictional force exerted between arcuate outer edge 147 of interlock plate 119 and ear 143 maintains setting member 108 in the position shown. This simple, initial manual setting is sufficient to assure that when the operator depresses camera actuating member 60, the camera's automatic exposure control system will select the smallest diaphragm aperture (maximum depth of field) consistent with good exposure.

(Attention is called to the fact that the second embodiment as illustrated in FIGS. 6 and 8 may be easily substituted into the camera illustrated in FIGS. 1 and 3, the release of sensing member 90 being occasioned by the release of rocker 56 by flange 59 of camera actuating member 60, and the opposite end of rocket 56 being in contact with sensing member 90 at a centrally located ear such as 54 on sensing member 28. In effect then, the second embodiment differs from that illustrated in FIGS. 1, 2, and 3 only insofar as the various control members illustrated in FIGS. 6 and 8 can be substituted for control member 28 and arms 30 and 32.)

When the operator depresses actuating member 60, pointer sensing member 90 moves upwardly until its stepped upper edge 100 contacts pointer 70 of measuring instrument 72. Since member 108 is locked in position as just described above, its pin 111 cooperates with arm 110 of the shutter speed ring 84 to maintain speed ring 84 in its predetermined position causing the shutter control mechanism to provide a shutter time of 1/25 of a second in the manner well known in the art. Since shutter speed ring 84 is locked in position, the lefthand portion of rocker 102 is held against vertical motion by connecting arm 104 and pin 80 of shutter speed ring 84. Therefore, as sensing member 90 moves in an upward direction, pin 92 which is integral therewith and acts as a pivot for rocker 102, also moves in an upward direction, causing rocker 102 to pivot about point 106. This causes the righthand end of rocker 102 to move upwardly through a greater arc than that described by pin 92, thereby increasing the relative movement of control ring 86 in a counterclockwise direction and causing a relatively smaller exposure aperture to be selected for any given value of scene brightness. When sensing member 90 is stopped by contact of its upper edge 100 with pointer 70, the camera's diaphragm is set to the minimum aperture value (maximum depth of field) commensurate with the correct exposure setting for the particular intensity of the light reflected from the scene being photographed.

Similarly, if it is assumed that the camera operator is photographing a moving object, stopping the motion becomes more important than obtaining accurate focus throughout the entire field being photographed, and shutter speed is far more critical than aperture size in determining a satisfactory result. Under these conditions the camera may be preset by moving member 109 downwardly away from its uppermost position. This permits interlock plate 119 to move to the right under the influence of spring 135 and thereby releases ear 143 from the frictional force exerted upon it by arcuate outer edge 147 of interlock plate 119, allowing member 109 to be moved to its uppermost position by action of spring 115. As member 109 reaches its uppermost position, it drives interlock plate 121 to the right against the force of spring 137 and causes outer arcuate edge 149 of interlock plate 121 to frictionally engage ear 145 of member 109, thereby assuring that member 109 will be maintained in the particular position to which it is set.

In this case, when the camera operator depresses actuating member 60, releasing sensing plate 90 for its upward motion, aperture setting ring 86 will rotate counterclockwise only until such time as its arm 85 contacts pin 113 on member 109, indicating that the aperture setting selected by the position of member 109 has been reached. Any further upward motion of sensing member 90 prior to contact of its stepped upper edge 100 with pointer 70 of measuring instrument 72, causes rocker 102 to pivot in a clockwise direction about point 107 which is now being prevented from further upward movement by the effect of member 109 as just described. This causes the lefthand end of rocker 102 to move upwardly through a greater arc than that described by pin 92, and this increased relative motion is imparted through arm 104 and pin 80 to shutter speed ring 84, thereby causing a relatively faster shutter speed to be selected for any given level of light intensity. When sensing member 90 is stopped by contact of its upper edge 100 with pointer 70, the camera's shutter is set for the maximum speed (maximum motion-stopping capability) commensurate with the correct exposure setting for prevailing lighting conditions.

It should be noted, however, that for the most common amateur photographic subject matter, the operator merely moves both stop members 108 and 109 to their respective uppermost positions, thereby freeing arms 85 and 110 of setting rings 84 and 86 to move upwardly in response to the movement of sensing member 90. It can be seen that, when set in this manner, the second embodiment provides a fully programmed exposure control similar to that of the first embodiment as described above.

COMPENSATION FOR NONLOGARITHMIC INSTRUMENT RESPONSE

It is desirable to compensate for the nonlogarithmic response of the typical exposure meter instrument which might be employed in a camera utilizing either of the embodiments of the present invention, so that equal increments along the stepped sensing surface 29 of the pointer sensing member 28 (FIGS. 1–3 and 7) will always correspond to increments of movement of the instrument pointer in response to geometric changes in scene brightness. It has been discovered that this object may be accomplished by forming the stepped surface 29 of the sensing member 28 along a curve which intersects certain radii from the pivotal axis of the instrument pointer. These radii are coincident with and defined by pointer positions assumed in response to geometric increments of scene brightness. The curve is formed such that the linear distances between its intersections with successive ones of said radii are equal, and the shape of the curve is determined by measuring such equal steps. A curve determined in this manner for a typical instrument is shown at 31 in FIG. 7, where the radii spaced in accordance with geometric increments of scene brightness are shown at 71.

It has been discovered further that a curve determined as above from a typical instrument may be approximated with nicety by the arc of a circle of empirically determined radius. In accordance withe this discovery, the stepped surface 29 of sensing member 28, illustrated in FIGS. 1–3 and 7, is formed as the arc of a circle whose radius is determined empirically. Obviously, the sensing member 28 might be formed exactly along curve 31 (FIG. 7), which would precisely compensate for the nonlogarithmic response of the instrument from which curve 31 was determined. However, manufacturing the sensing member in the shape of an arc of a circle is somewhat less expensive and has been found to be sufficiently precise for most purposes in amateur photography.

FILM SPEED COMPENSATION

In order to compensate for changes in film speed in the exposure control systems described above it has been found desirable to move the instrument body itself. However, in order that the approximate linearity achieved for the sensing member (by forming its sensing surface in an arc of a circle) may be maintained at any position of the instrument body, i.e., for any film speed, the instrument body is moved in an arc of another circle concentric with that in which the sensing member is formed. Obviously, if the sensing surface is formed in a curve other than the arc of a circle the instrument body should be moved in a curve which is equidistant therefrom. The following mechanism has been found convenient for positioning the instrument body 72 automatically as a function of the speed of a roll of film contained in any of a set of magazines that may be inserted into the camera.

Referring to FIGS. 1–3 and 9, the camera cover 112 has a back 114 hinged at 116 for opening. A locking plate 118 is mounted inside the top surface of cover 112 for sliding movement transversely of the taking-lens axis. A spring 120 urges plate 118 to the left as viewed in FIG. 9 and can be overcome by the manual operation of a slide knob 122 secured to plate 118 in a hole 124 and extending through a slot 123 in cover 112. A locking arm 126 on plate 118 cooperates with a pin 129 in the hinged camera back 114 to hold the latter in its closed position when plate 118 is released for leftward movement under spring tension after insertion of a magazine.

An arm 128 on plate 118 cooperates with a pin 130 on a control plate 132, which, like plate 118, is mounted for sliding movement transversely of the taking lens axis. The control plate 132 is guided by a pair of pins 134 and 136 which extend into respective slots 138 and 140 in that plate, and is urged to the left (as viewed in FIGS. 1 and 3) by resilient means, illustrated as a spring 142, secured to a film-speed sensing pawl 144, which is pivotally mounted at 146 on plate 132. An upturned ear 148 on plate 132 limits the clockwise movement of pawl 144 about pivot 146. The tension of spring 142 normally maintains pawl 144 rotated against ear 148. A down-turned ear 150 on pawl 144 is adapted to cooperate with a surface irregularity, illustrated as a notch 152, in a magazine 154, the magazine being insertable into the back of the camera when the hinged back 114 is swung away from the camera body. The insertion of the magazine into the camera is accomplished in the following manner.

Button 122 is moved to the right to the end of slot 123 for releasing pin 129 from locking arm 126, at which time the camera back may be opened. The button 122 may be held to the right or released. Magazine 154 is then inserted into the camera back with notch 152 in an upper, forward position and button 122 is returned to the right, if it had been released. Arm 128 thereby forces pin 130 and plate 132 to the right against the tension of spring 142, thereby moving ear 150 toward the righthand end of the magazine surface 153 in which notch 152 is cut. Surface 153 bears against ear 150, rocking the sensing pawl 144 counterclockwise (as viewed in FIG. 9) about pivot 146 against the tension of spring 142. With the magazine fully seated in the camera the back is closed and button 122 is released, which permits plates 118 and 132 to be moved to the left. The locking plate 118 is moved to its full left position by spring 120, where locking arm 126 comes to rest against pin 129 for locking the camera back in its closed position. The control plate 132 is moved to the left by spring 142 until ear 150 enters notch 152 under the tension of spring 142. This stops further leftward movement of the plate 132 at a position corresponding to the position of notch 152. The position of this notch is empirically determined as a function of the speed of the photographic film contained in magazine 154. The higher the film speed the further to the right notch 152 will be cut.

It will be obvious that a separate spring may be employed for urging pawl 144 into notch 152, but that use of the single spring 142 both for this purpose and for moving plate 132 is more economical.

A downwardly extending arm 156 on control plate 132 has a slot 158 which extends also into the horizontal portion of that plate. A pin 160 extends into slot 158 and is secured to a plate 168 on which the exposure meter instrument 72 is mounted. Plate 168 is loosely secured to the camera cover 112 by rivets 170 and 172, which extend through an arcuate slot 174 in the cover. When the control plate 132 is positioned in the manner described above, its slot 158 therefore positions pin 160 and instrument 72 along an arcuate path determined by the shape of slot 174. The latter slot is shaped such that the pivotal axis of pointer 70 moves along a path which is substantially equidistant from the cylindrical upper surface of the pointer sensing member 28.

FLASH OPERATION

Figure 11:
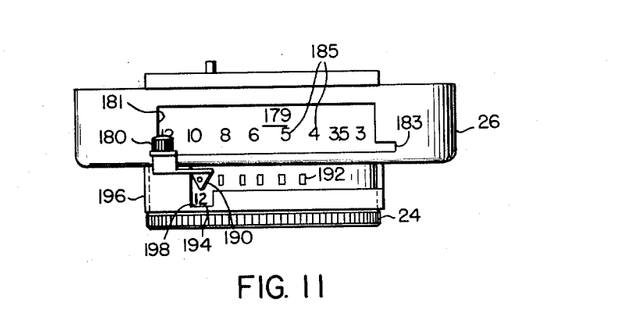

When either embodiment of the camera described above is to be used in flash operation, it is desirable to disable the automatic exposure control system and to couple the diaphragm and focus adjustments to each other. It is further desirable to adjust both the diaphragm and focus as related functions of film speed. The mechanism for achieving these results is as follows:

Referring again to FIGS. 1-3 and 9, when the camera adjustment is changed from automatic, or daylight, to flash operation, the shutter housing member 26, which constitutes means for selecting a mode of photography (daylight or flash), is rotated clockwise (as viewed in FIG. 1) to move an index mark 182 from alignment with a fixed mark "DAYLIGHT" to a fixed mark "FLASH." This moves a window 181 in a rearwardly extending flange of housing member 26 from a position shown in FIGS. 3 and 10 to a position shown for example in FIG. 11. In the former position, window 181 is offcenter of the optical axis, looking down on the camera as in FIGS. 3 and 10, and covers the axially aligned portion of a subject distance scale 185, which is carried by an indicating member 179 rotatably mounted about hub 25 inside the housing member 26. Thus, during daylight operation of the camera the flange of housing member 26 constitutes a cover member for scale 185. When housing member 26 is moved to its FLASH position, window 181 becomes centered vertically above the lens axis and discloses to the camera operator the axial portion of distance scale 185. Movement of member 26 to its FLASH position also moves a lip 184 (FIGS. 2 and 8) of the housing member into a position overlying an ear 186 on the pointer sensing member 28 or 90, thereby preventing that sensing member from moving upwardly into sensing engagement with the meter pointer. This disables the automatic exposure control system during flash operation.

Downwardly extending arm 156 (FIG. 9) of control plate 132 has an open slot 176 engaging a pin 178 (FIGS. 1-3), which is integral with member 179 carrying distance scale 185. Therefore, movement of plate 132 to the right or left (as viewed in FIGS. 1 and 3) during adjustment of the camera for film speed as previously described, moves pin 178 to the right or left, thereby rotating member 179 about hub 25 and aligning a corresponding portion of the distance scale with window 181.

During daylight operation of the camera, an arm 180 (FIGS. 2 and 5), which is integral with the outer diaphragm ring 88, engages a slot 183 (FIGS. 10 and 11) of window 181 and thereby is prevented from moving to the right for rotating the diaphragm ring 88 to adjust the diaphragm. When the housing member 26 is moved to its FLASH position, arm 180 is freed for movement to the right for rotating ring 88 clockwise to adjust the diaphragm. It will be noted that ring 86 (FIG. 5) is held stationary at this time because of the disabling of the automatic exposure control system. Therefore, ring 86 acts as a stationary member about which the diaphragm blades 83 are pivoted at 87.

An extension 188 (FIGS. 2, 3, 8 and 10) of diaphragm adjusting arm 180 has a leaf-spring foot 190 adapted to engage a series of detents 192 on the outer surface of the focus adjusting member 24. When diaphragm adjusting arm 180 is moved, the engagement of its foot 190 with a detent 192 carries member 24 along with it, unless the latter member is manually held against rotation thereby causing the spring urged foot 190 to ride out of the detents 192.

Figure 12:
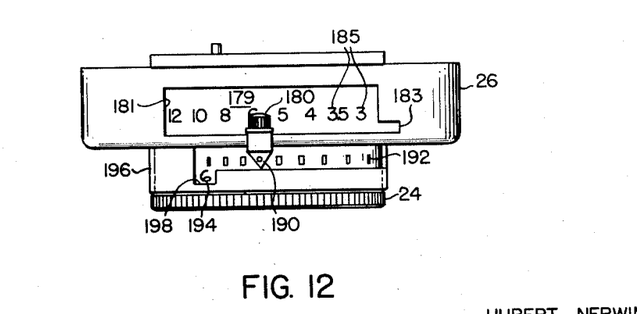

FIGS. 10, 11 and 12 show member 179 in a position corresponding to a relatively low film speed. FIG. 10 shows the position of the mechanism when the camera is adjusted for daylight or automatic operation and FIGS. 11 and 12 show the adjustments for flash operation. Immediately after member 26 is rotated to its flash position the camera operator manually moves member 24, which carries a focus scale 194, while holding member 180 stationary, until the number opposite foot 190 on focus scale 194 corresponds to the number opposite the arm 180 on the distance scale 185. This matching is shown in FIG. 11 and constitutes the proper relative coupling positions for members 24 and 179. Thereafter, member 180 may be moved to the right to select any subject distance within the range shown in window 181. This adjusts the diaphragm to a proper aperture for the selected flash distance and at the same time, through the coupling of foot 190 to one of the detents 192, moves the focus adjusting member 24 to the correct focus corresponding to the selected flash distance. The latter setting is shown in FIG. 12.

In order to simplify the use of the scale couplings and to prevent misinterpretation of the position of foot 190 after the original coupling of the two distance scales, the focusing member 24 preferably is covered by a stationary cap 196 (FIGS. 2, 3 and 10-12) having a slot 197 adapted to receive foot 190 of diaphragm adjusting member 180 and to expose only one indicium in the focus scale 194 on member 24. The one exposed indicium or mark is at the position opposite foot 190 when member 180 is in its leftmost position, i.e., in the position where the operator couples the two scales together by matching the exposed value on scale 194 with the value opposite member 180 on scale 185. After the coupling occurs and member 180 is moved to the right to select a subject distance, the selected subject distance always appears in slot 198 of cover member 196. The number on scale 194 which is opposite foot 190 at this time is meaningless and is concealed by cover member 196.

Figure 13:
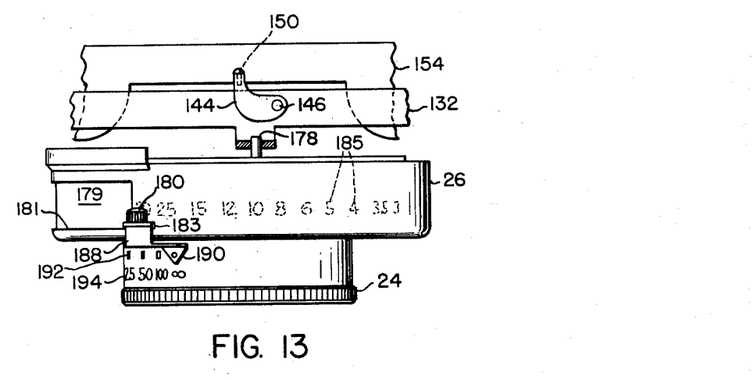
Figure 14:
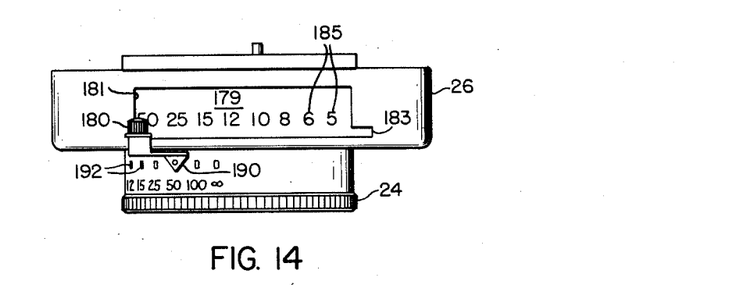
Figure 15:
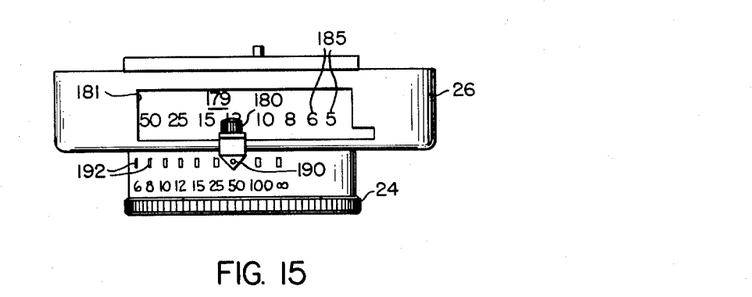

FIGS. 13, 14 and 15 correspond to FIGS. 10, 11 and 12, but show the adjustments of the camera for flash operation with a higher film speed, which moves member 179 further clockwise to expose a higher range of subject distance values in scale 185, through window 181.

The invention has been described in detail with particular reference to preferred embodiments thereof, but it will be understood that variations and modifications can be effected within the spirit and scope of the invention as described hereinabove and as defined in the appended claims.

I claim:

1. In a camera having exposure regulating devices including a variable speed shutter and an adjustable lens diaphragm, the combination comprising: an exposure meter including a photocell illuminatable by field light, and an electrical measuring instrument electrically connected to said cell, said intrument having a pointer movable as a function of field brightness; a pointer sensing member; means guiding said sensing member for movement; a camera actuating member coupled to said sensing member for yieldably moving said sensing member into engagement with said pointer in response to operation of said actuating member; differential means interrelating said sensing member with said diaphragm and said shutter for adjusting both said diaphragm and said shutter in response to movement of said sensing member; a pair of manually settable stop means cooperating with said shutter and said diaphragm, respectively, for selectively limiting the adjustment of either of said last-named exposure regulating devices, each said manual settable stop means having a respective initial position; and respective holding means for maintaining either of said stop means in a manually set position away from its initial position; and interlock means interrelating said stop means for disabling the holding means for one stop means in response to movement of the other stop means away from its initial position.

2. In a camera, the combination comprising: an exposure meter including a photocell adapted to be illuminated by field light, and an electrical measuring instrument electrically connected to said cell, said instrument having a pointer angularly movable about a pivot as a nonlogarithmic function of field brightness; a pointer sensing member having a curved surface with a sensing edge; means for moving said measuring instrument to compensate for changes in an exposure factor; means for guiding said instrument for movement in a path such that the pivot of said pointer remains substantially equidistant from the curved surface of said sensing member; a manually operable camera actuating member; means coupling said actuating member to said sensing member for yieldably moving said sensing member in a predetermined path, in response to operation of said actuating member, to engage said sensing edge with said pointer, the shape of the curved surface of said sensing member being such that for any position of said instrument along its path, within a predetermined range of such positions, the path of said curved surface intersects, at approximately equally-spaced points, respective loci assumed by said pointer in response to successive geometrically progressing values of field brightness; at least one exposure regulating device; and means coupling said sensing member to said exposure regulating device for adjusting the latter as a function of the extent of movement of said sensing member.

3. In a camera, the combination comprising: an exposure meter including a photocell adapted to be illuminated by field light, and an electrical measuring instrument electrically connected to said cell, said instrument having a pointer angularly movable about a pivot as a nonlogarithmic function of field brightness; a pointer sensing member having a curved surface with a sensing edge; a manually operable camera actuating member; means coupling said actuating member to said sensing member for yieldably moving said sensing member in a predetermined path, in response to operation of said actuating member, to engage said sensing edge with said pointer, the shape of the curved surface of said sensing member being such that it intersects, at substantially equally-spaced points, the respective different positions assumed by said pointer in response to successive geometrically progressing values of field brightness, thereby compensating substantially for the nonlogarithmic relation between field brightness and angular movement of said pointer; at least one exposure regulating device; and means coupling said sensing member to said exposure regulating device for adjusting the latter as a function of the extent of movement of said sensing member.

4. In a camera, the combination comprising: an exposure meter including a photocell adapted to be illuminated by field light, and an electrical measuring instrument electrically connected to said cell, said instrument having a pointer angularly movable about a pivot as a nonlogarithmic function of field brightness; a pointer sensing member having a curved surface with a sensing edge; a manually operable camera actuating member; means coupling said actuating member to said sensing member for yieldably moving said sensing member in a predetermined path, in response to operation of said actuating member, to engage said sensing edge with said pointer, the shape of the curved surface of said sensing member being such that the path of its sensing edge intersects, at approximately equally-spaced points, respective loci assumed by said pointer in response to successive geometrically progressing values of field brightness, thereby compensating substantially for the nonlogarithmic relation between field brightness and angular movement of said pointer; means for moving said measuring instrument to compensate for changes in an exposure factor; means for guiding said instrument for movement in a path such that the pivot of said pointer remains substantially equidistant from the curved surface of said sensing member, thereby to maintain said substantial compensation at any position of said instrument along its path, within a predetermined range of such positions; at least one exposure regulating device; and means coupling said sensing member to said exposure regulating device for adjusting the latter as a function of the extent of movement of said sensing member.

5. The combination defined in claim 3, wherein said exposure regulating device comprises an adjustable lens diaphragm.

6. The combination defined in claim 3, wherein said exposure regulating device comprises a variable speed shutter.

7. The combination defined in claim 6, with: a second adjustable exposure regulating device comprising an adjustable lens diaphragm; and means coupling said sensing member to said diaphragm for adjusting the latter, along with said shutter, as a function of the extent of movement of said sensing member.

8. The combination defined in claim 7, with: a manually settable stop member for selectively limiting the adjustment of one of said exposure regulating devices; and differential means interconnecting said exposure regulating devices.

9. The combination defined in claim 7, with: respective manually settable stop members for selectively limiting the adjustment of either of said exposure regulating devices; and differential means interconnecting said exposure regulating devices.

10. The combination defined in claim 9, wherein each of said manually settable stop members has a respective initial position, with: respective holding means for maintaining either of said stop members in a manually set position away from its initial position; and means interrelating said stop members for disabling the holding means for one stop member in response to movement of the other stop member away from its initial position.

11. The combination defined in claim 7, wherein said diaphragm comprises a pair of diaphragm setting rings and a plurality of blades adapted to form an exposure aperture, each of said blades being pivotally mounted at each of its ends to respective ones of said rings, a first one of said rings being coupled to said sensing member for movement thereby, the second ring being adapted for manual movement, with: focus adjusting means; a yieldable coupling between said focus adjusting means and said second diaphragm setting ring; a manually operable mode selecting member adapted to control said rings and having a first position for permitting movement of said first ring by said sensing member and for holding said second ring stationary, and having a second position for permitting movement of said ring and for holding said first ring stationary.

12. The combination defined in claim 11, with: means comprising a part of said mode selecting member for disabling movement of said sensing member when said mode selecting member is in its second position.

13. The combination defined in claim 11, with: means for moving said measuring instrument to compensate for changes in an exposure factor; means for guiding said instrument for movement in a path such that the pivot of said pointer remains substantially equidistant from the curved surface of said sensing member, thereby to maintain said substantial compensation at any position of said instrument along its path, within a predetermined range of such positions; a movable scale member carrying a scale of subject distance indications; a cover member movable with said mode selecting member and having a window for exposing a range of subject distances on said scale at a predetermined viewing locus only when said mode selecting member is in its second position; and means for moving said scale member with said instrument for varying the alignment of said scale with said window as a function of the value of the exposure factor represented by the position of said instrument.

14. The combination defined in claim 1, wherein said diaphragm comprises a pair of diaphragm setting rings and a plurality of blades adapted to form an exposure aperture, each of said blades being pivotally mounted at each of its ends to respective ones of said rings, a first one of said rings being coupled to said sensing member for movement thereby, the second of said rings being adapted for manual movement, with: focus adjusting means; a yieldable coupling between said focus adjusting means and said second diaphragm setting ring; a manually operable mode selecting member adapted to control said rings and having a first position for permitting movement of said first ring by said sensing member and for holding said second ring stationary, and having a second position for permitting movement of said second ring and for holding said first ring stationary.

15. The combination defined in claim 14, with: means comprising a part of said mode selecting member for disabling movement of said sensing member when said mode selecting member is in its second position.

16. The combination defined in claim 14, with: a movable scale member carrying a scale of subject distance indications; a cover member movable with said mode selecting member and having a window for exposing a range of subject distances on said scale at a predetermined viewing locus only when said mode selecting member is in its second position; and means for moving said scale member for varying the alignment of said scale with said window.

17. The combination defined in claim 16, wherein said second diaphragm setting ring includes a lever extending through said window, said lever being in contact with an edge of said window and thereby held in an initial position when said mode selecting member is in its first position, for maintaining said second ring stationary, said lever being movable away from its initial position and into alignment wtih any selected subject distance indication in the portion of said scale that is aligned with said window, when said mode selecting member is in its second position, thereby moving said second ring to establish a diaphragm opening corresponding to said selected subject distance.

18. The combination defined in claim 17, wherein said yieldable coupling between the focus adjusting means and the second diaphragm setting ring comprises a yieldable member connected to said lever and cooperating with detents in said focus adjusting means, whereby movement of said lever to adjust said diaphragm also moves said focus adjusting means for adjusting focus in accordance with said selected subject distance.

19. The combination defined in claim 18, wherein said focus adjusting means comprises an annular focusing member angularly movable about said axis and carrying said detents and carrying a focus scale graduated in subject distance indications, said combination further including a pointer integral with said yieldable member and cooperating with said focus scale, said focusing member being movable independently of said lever to align corresponding distance indications of said two scales with said pointer and said lever, respectively, when said lever is in its initial position.

20. The combination defined in claim 19, with means covering all portions of said focus scale except that portion which is opposite said pointer when said lever is in its initial position.

21. In a camera, the combination comprising: an exposure meter including a photocell adapted to be illuminated by field light, and an electrical measuring instrument electrically connected to said cell, said instrument having a pointer angularly movable as a function of field brightness; a pointer sensing member; a manually operable camera actuating member; means coupling said actuating member to said sensing member for yieldably moving said sensing member into engagement with said pointer in response to operation of said actuating member; an adjustable diaphragm including a pair of diaphragm setting rings and a plurality of blades for forming an exposure aperture, each of said blades being pivotally mounted at each of its ends to respective ones of said rings, a first one of said rings being coupled to said sensing member for movement thereby, the second of said rings being adapted for manual movement; focus adjusting means; a yieldable coupling between said focus adjusting means and said second diaphragm ring; a manually operable mode selecting member adapted to control said rings and having a first position for permitting movement of said first ring by said sensing member and for holding said second ring stationary, and having a second position for permitting movement of said second ring and for holding said first ring stationary.

22. The combination defined in claim 21, with: means comprising a part of said mode selecting member for disabling movement of said sensing member when said mode selecting member is in its second position.

23. The combination defined in claim 21, with: a movable scale member carrying a scale of subject distance indications; a cover member movable with said mode selecting member and having a window for exposing a range of subject distances on said scale at a predetermined viewing locus only when said mode selecting member is in its second position; and means for moving said scale member for varying the alignment of said scale with said window.

24. The combination defined in claim 23, wherein said second diaphragm setting ring includes a lever extending through said window, said lever being in contact with an edge of said window and thereby held in an initial position when said mode selecting member is in its first position, for maintaining said second ring stationary, said lever being movable away from its initial position and into alignment wtih any selected subject distance indication in the portion of said scale that is aligned with said window, when said mode selecting member is in its second position, thereby moving said second ring to establish a diaphragm opening corresponding to said selected subject distance.

25. The combination defined in claim 24, wherein said yieldable coupling comprises a yieldable member connected to said lever and cooperating with detents in said focus adjusting means, whereby movement of said lever to adjust said diaphragm also moves said focus adjusting means for adjusting focus in accordance with said selected subject distance.

26. The combination defined in claim 25, wherein said focus adjusting means comprises an annular focusing member angularly movable about said axis and carrying said detents and carrying a focus scale graduated in subject distance indications, said combination further including a pointer integral with said yieldable member and cooperating with said focus scale, said focusing member being movable independently of said lever to align corresponding distance indications of said two scales with said pointer and said lever, respectively, when said lever is in its initial position.

27. The combination defined in claim 26, with means covering all portions of said focus scale except that portion which is opposite said pointer when said lever is in its initial position.

28. In a camera, the combination comprising: an exposure meter including a photocell adapted to be illuminated by field light, and an electrical measuring instrument electrically connected to said cell, said instrument having a pointer angularly movable about a pivot as a nonlogarithmic function of field brightness; a pointer sensing member having a curved surface with a sensing edge; means for moving said measuring instrument to compensate for changes in an exposure factor; means for guiding said instrument for movement in a path such that the pivot of said pointer remains substantially equidistant from the curved surface of said sensing member; a manually operable camera actuating member; means coupling said actuating member to said sensing member for yieldably moving said sensing member, in response to operation of said actuating member, to engage said sensing edge wth said pointer, the shape of the curved surface of said sensing member being such that in each of a plurality of substantially different positions of said instrument, engagement of said sensing edge with said pointer at substantially equally spaced positions along said edge corresponds to geometric changes in field brightness; at least one exposure regulating device; and means coupling said sensing member to said exposure regulating device for adjusting the latter as a function of the extent of movement of said sensing member.

References Cited by the Examiner
UNITED STATES PATENTS

| | | | |
|---|---|---|---|
| 2,325,463 | 7/43 | Axler | 95—10 |
| 2,906,166 | 9/59 | Herterich | 95—10 |
| 2,925,760 | 2/60 | Broschke | 95—10 |
| 2,930,282 | 3/60 | Herterich | 95—10 |
| 2,940,046 | 6/60 | Herterich | 95—10 |
| 2,999,441 | 9/61 | Hutchison | 95—10 |

EVON C. BLUNK, *Primary Examiner.*

DELBERT B. LOWE, EMIL G. ANDERSON, NORTON ANSHER, *Examiners.*